US012755753B2

(12) United States Patent
Kuwahara

(10) Patent No.: US 12,755,753 B2
(45) Date of Patent: Oct. 6, 2026

(54) DISK DEVICE AND MANUFACTURING METHOD FOR DISK DEVICE

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Satoshi Kuwahara, Kawasaki Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 18/828,063

(22) Filed: Sep. 9, 2024

(65) Prior Publication Data

US 2025/0292789 A1 Sep. 18, 2025

(30) Foreign Application Priority Data

Mar. 15, 2024 (JP) ................................ 2024-041591

(51) Int. Cl.
*G11B 5/596* (2006.01)
*G11B 5/012* (2006.01)

(52) U.S. Cl.
CPC .................................. *G11B 5/012* (2013.01)

(58) Field of Classification Search
CPC . G11B 5/5543; G11B 5/5547; G11B 20/1217; G11B 20/1258; G11B 5/5965; G11B 5/59688; G11B 5/59661; G11B 5/59666; G11B 5/59672; G11B 5/59677; G11B 200/1281; G11B 5/59633
USPC ................................................ 360/48, 77.04
See application file for complete search history.

(56) References Cited

U.S. PATENT DOCUMENTS

| | | | |
|---|---|---|---|
| 8,531,794 B2 | 9/2013 | Nonaka et al. | |
| 9,070,411 B1 * | 6/2015 | Ellis .................. | G11B 5/59633 |
| 11,694,720 B1 | 7/2023 | Tagami et al. | |
| 11,735,220 B2 | 8/2023 | Wu et al. | |
| 2005/0280916 A1 | 12/2005 | Calfee et al. | |
| 2007/0258162 A1 | 11/2007 | Nakagawa et al. | |
| 2013/0033783 A1 | 2/2013 | Gerasimov | |
| 2013/0335847 A1 | 12/2013 | Shiroishi | |

(Continued)

FOREIGN PATENT DOCUMENTS

JP 2023130108 A 9/2023

*Primary Examiner* — Nabil Z Hindi
(74) *Attorney, Agent, or Firm* — Maier & Maier, PLLC

(57) ABSTRACT

According to one embodiment, there is provided a disk device including a head, a disk medium and a controller. The disk medium includes multiple zones concentrically provided. The controller, when two servo patterns corresponding to two adjacent zones are written by the head on a track of a boundary area between the two adjacent zones of the multiple zones, generates timing correction data according to a radial position of the boundary area. The controller writes one servo pattern of the two servo patterns on the track of the boundary area. The controller writes the other servo pattern of the two servo patterns, at a position circumferentially shifted from the one servo pattern in the track of the boundary area, according to the timing correction data.

18 Claims, 11 Drawing Sheets

(56) References Cited

U.S. PATENT DOCUMENTS

| | | | |
|---|---|---|---|
| 2014/0104724 | A1 | 4/2014 | Shiroishi et al. |
| 2022/0301584 | A1 | 9/2022 | Tagami |

* cited by examiner

DISK DEVICE AND MANUFACTURING METHOD FOR DISK DEVICE

CROSS-REFERENCE TO RELATED APPLICATIONS

This application is based upon and claims the benefit of priority from Japanese Patent Application No. 2024-041591, filed on Mar. 15, 2024; the entire contents of which are incorporated herein by reference.

FIELD

Embodiments described herein relate generally to a disk device and a manufacturing method for the disk device.

BACKGROUND

In a disk device adopting a zone servo system, a disk medium is divided into multiple concentric zones, and servo patterns are written at different write frequencies for the respective zones. At a radial position of a zone boundary area, a mixture of two servo patterns having different write frequencies is written. At this time, it is desired to improve format efficiency.

DETAILED DESCRIPTION

In general, according to one embodiment, there is provided a disk device including a head, a disk medium and a controller. The disk medium includes multiple zones concentrically provided. The controller, when two servo patterns corresponding to two adjacent zones are written by the head on a track of a boundary area between the two adjacent zones of the multiple zones, generates timing correction data according to a radial position of the boundary area. The controller writes one servo pattern of the two servo patterns on the track of the boundary area. The controller writes the other servo pattern of the two servo patterns, at a position circumferentially shifted from the one servo pattern in the track of the boundary area, according to the timing correction data.

Exemplary embodiments of a disk device will be explained below in detail with reference to the accompanying drawings. The present invention is not limited to the following embodiments.

EMBODIMENTS

In a disk device according to an embodiment, a zone servo system is adopted, a disk medium is divided into multiple concentric zones, and servo patterns are written at different write frequencies for the respective zones, but the disk device is devised to improve format efficiency in a zone boundary area.

Figure 1:
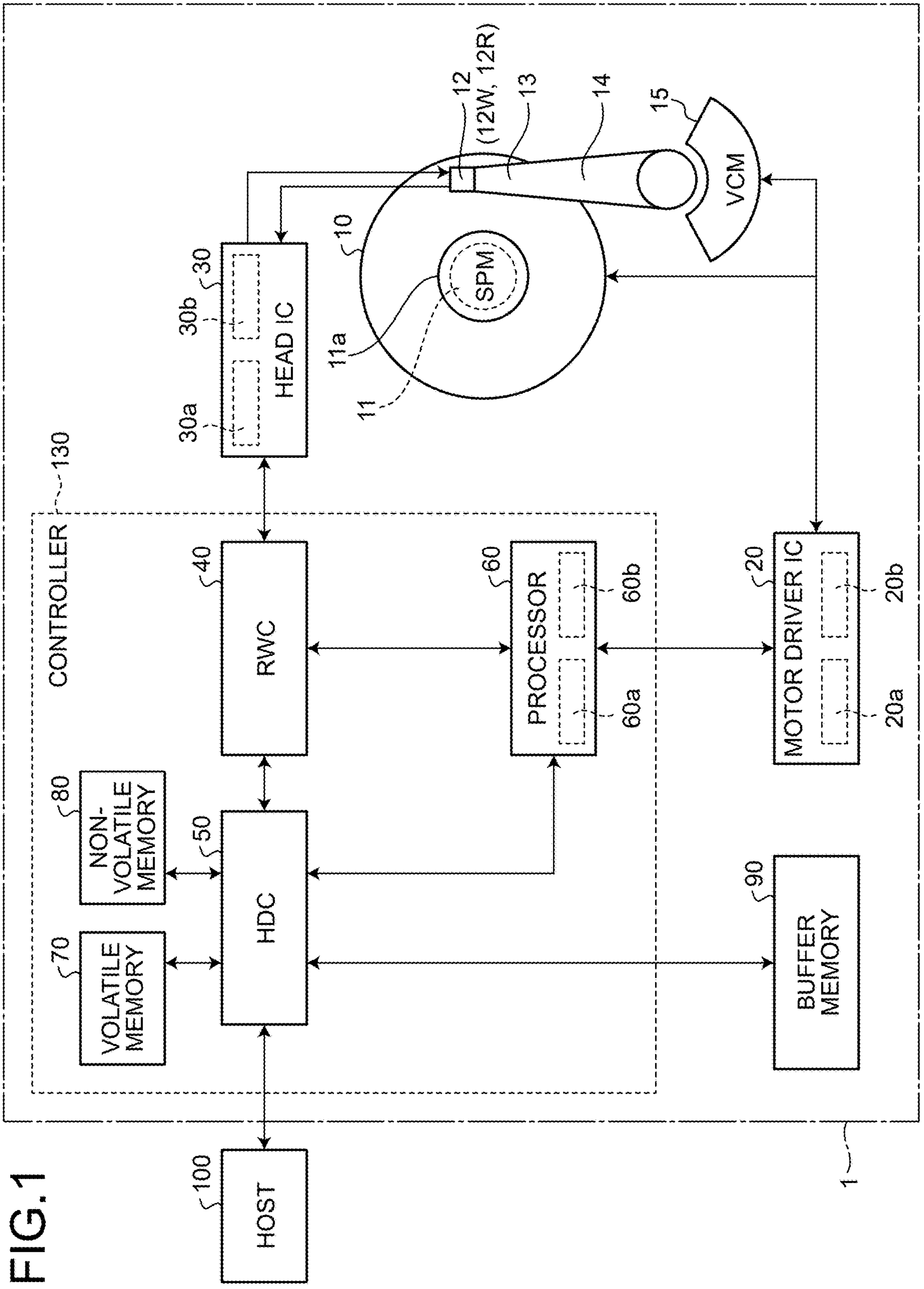
FIG. 1 is a diagram illustrating a configuration of a disk device according to an embodiment.

The disk device 1 can be configured as illustrated in FIG. 1. FIG. 1 is a diagram illustrating a configuration of the disk device 1.

The disk device 1 is configured to be connected to a host 100 via a communication link. The communication link may be a wired communication path such as a serial cable. The disk device 1 is, for example, a hard disk drive, a magneto optical disk drive, or the like. The host 100 is, for example, a personal computer, a processor, or the like.

As illustrated in FIG. 1, the disk device 1 includes a disk medium 10, a spindle motor (SPM) 11, a head 12, a suspension 13, a carriage arm 14, a voice coil motor (VCM) 15, a motor driver IC 20, a head IC 30, a buffer memory 90, and a controller 130.

The disk medium 10 is a disk-shaped recording medium that records various information, and is, for example, a magnetic disk, a magneto-optical disk, or the like. The disk medium 10 is rotationally driven by the SPM 11. The disk medium 10 includes, for example, multiple concentric zones about the vicinity of a rotation center of the SPM 11. Each of the zones further includes multiple concentric tracks. Each of the tracks is provided with multiple data sectors and servo sectors, not illustrated, alternately in the circumferential direction.

The head 12 may be arranged above the disk medium 10. The head 12 includes a read element 12R and a write element 12W. The read element 12R and the write element 12W are arranged at positions where the read element 12R and the write element 12W fly from the disk medium 10 by a predetermined height (e.g., approximately 10 nm) so as to face the disk medium 10.

The head 12 may be held above the disk medium 10 via the suspension 13 and the carriage arm 14. The carriage arm 14 slides the head 12 in a horizontal plane, in seeking or the like. The suspension 13 applies, to the head 12, a pressing force against a flying force of the head 12 caused an airflow during rotation of the disk medium 10, thereby keeping a flying height of the head 12 above the disk medium 10 constant. The suspension 13 includes, for example, a leaf spring.

The VCM 15 drives the carriage arm 14. The SPM 11 rotates the disk medium 10 about a spindle 11*a*. The VCM 15 and the SPM 11 are fixed to a housing.

The head IC 30 includes a write current control unit 30*a* and a read signal detection unit 30*b* to amplify and detect a signal during recording/reproduction. The write current control unit 30*a* controls a write current flowing through the write element 12W. The read signal detection unit 30*b* detects a signal read by the read element 12R.

The motor driver IC 20 includes an SPM control unit 20*a* and a VCM control unit 20*b* to drive the SPM 11 and the VCM 15. The SPM control unit 20*a* controls the rotation of the SPM 11. The VCM control unit 20*b* controls the drive of the VCM 15.

The controller 130 includes the head IC 30, the motor driver IC 20, a read/write channel (RWC) 40, an HDC 50, a processor 60, a volatile memory 70, and a non-volatile memory 80, and controls each unit of the disk device 1. With this configuration, the controller 130 controls positions (radial positions) of the read element 12R and the write element 12W in a radial direction relative to the disk medium 10, on the basis of servo information read by, for example, the read element 12R.

The RWC 40 performs data transmission/reception between the head IC 30 and the HDC 50. The data includes read data, write data, and the servo information. For example, the RWC 40 converts a signal reproduced by the read element 12R to a data format handled by the host 100, and converts data output from the host 100 to a signal format recorded by the write element 12W. In addition, the RWC 40 performs a decoding process for the signal reproduced by the read element 12R and performs coded modulation for data output from the host 100.

For example, the HDC 50 performs read/write control on the basis of a command from the host 100 or performs data transmission/reception between the host 100 and the RWC 40.

The processor 60 performs servo processing. The servo processing includes decoding the servo information, reading the servo information, grasping a position of the head 12 based on the servo information, and the like. The processor 60 performs demodulation for the position of the head 12 according to a read signal received from the RWC 40 to obtain an error (positional error) of the demodulated position from a target position. The processor 60 obtains a control amount depending on the positional error.

The processor 60 includes a zone servo switching unit 60*a* and an estimation observer 60*b*. The estimation observer 60*b* estimates the radial position of the head 12 on the disk medium 10, for example, from a past history of the position of the head 12. The processor 60 identifies whether the head 12 is in which zone of the disk medium 10, depending on the estimated radial position. The zone servo switching unit 60*a* switches a write frequency SFG for the servo pattern in the servo processing according to whether the head 12 is in which zone of the disk medium 10. The zone servo switching unit 60*a* may switch the write frequency of each zone so that the write frequency is increased in a zone on an outer peripheral side relative to a zone on an inner peripheral side.

The volatile memory 70 is configured to temporarily store data and/or information received from the HDC 50. The volatile memory 70 functions as a workspace for the HDC 50.

The non-volatile memory 80 stores various setting parameter groups necessary for operation of the disk device 1, a setting value of the write frequency SFG provided for each zone, and a past position history of the head 12 used by the estimation observer 60*b* to calculate the estimated position.

The disk device 1 reads a signal from the disk medium 10 via the head 12 while rotating the disk medium 10 by the SPM 11, and the signal is read as the read signal by the read signal detection unit 30*b*. The read signal is converted to read information by the RWC 40 and then transmitted to the processor 60. The processor 60 performs tracking control of the head 12 on the basis of the servo information included in the read information.

The processor 60 calculates a current position of the head 12 on the basis of the servo information to perform seek control so that the head 12 approaches the target position. When the head 12 reaches the target position, the signal is read from the disk medium 10 via the head 12 or data or information is written to the disk medium 10.

Figure 2:
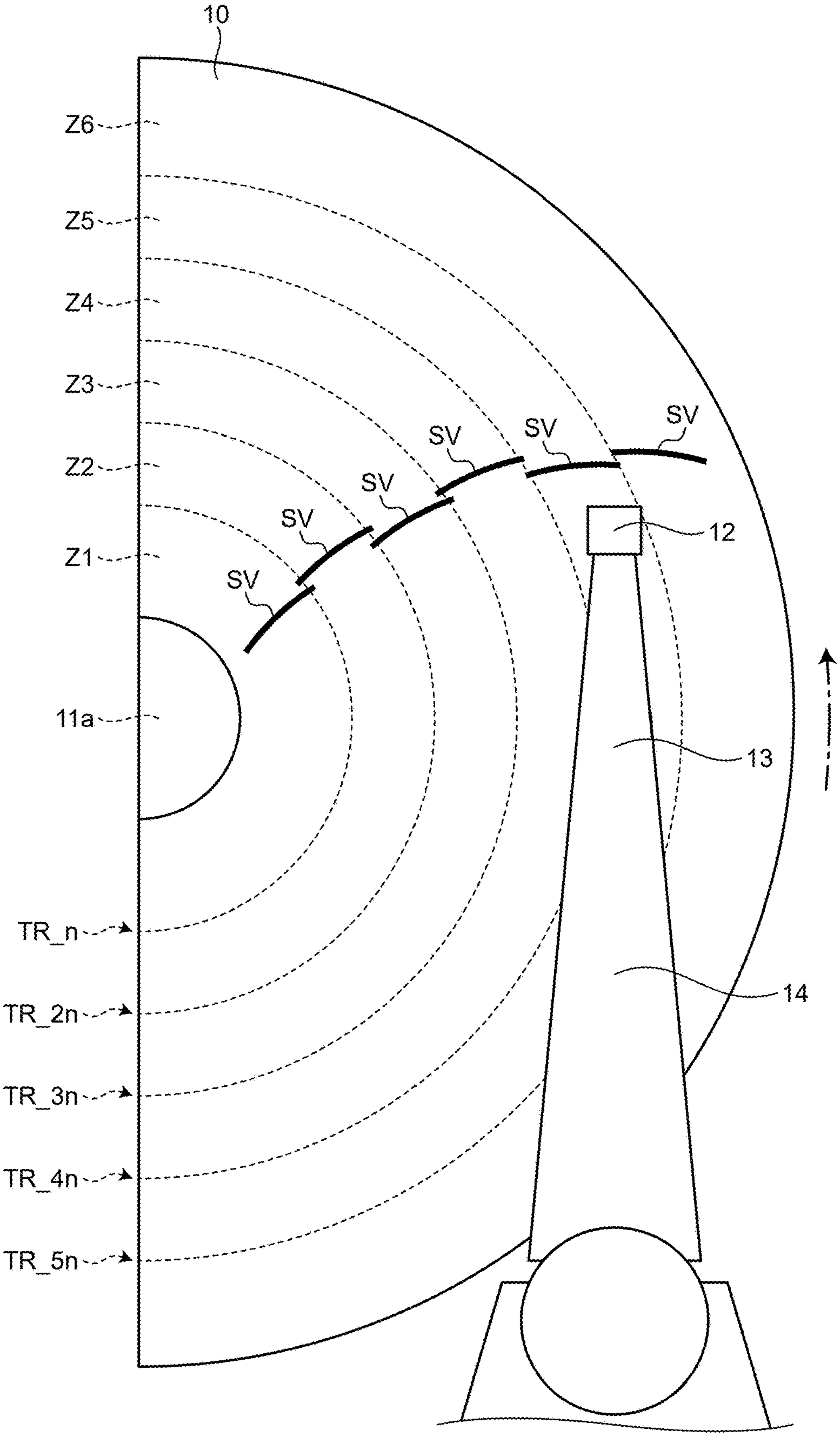
FIG. 2 is a diagram illustrating multiple zones of a disk medium in the embodiment.

The disk device 1 adopts the zone servo system, and the disk medium 10 is divided into multiple concentric zones Z1 to Z6 as illustrated in FIG. 2. FIG. 2 is a diagram illustrating the multiple zones Z1 to Z6 of the disk medium 10. FIG. 2 illustrates a configuration in which the disk medium 10 is provided with the six zones Z1 to Z6, but the number of zones Z provided in the disk medium 10 may be two to five or seven or more. Hereinafter, a direction opposite to a rotation direction of the disk medium 10 is referred to as the circumferential direction.

The disk device 1 rotates the disk medium 10 clockwise as in FIG. 2 at a predetermined rotational speed around the spindle 11*a*, and brings the head 12 forward in the circumferential direction indicated by a dashed-dotted arrow in FIG. 2. Therefore, the disk device 1 writes a servo pattern SV at a write frequency different for each of the zones Z1 to Z6 by the write element 12W. FIG. 2 illustrates one row of the servo patterns SV in the radial direction, for ease of description, but similar one row of the servo patterns SV may be repeatedly written in the circumferential direction in the disk medium 10. The head 4 has a higher circumferential speed in a zone Z on an outer peripheral side, and therefore, the servo pattern SV can be written at a higher write frequency SFG, on a zone Z on an outer peripheral side.

Figure 3:
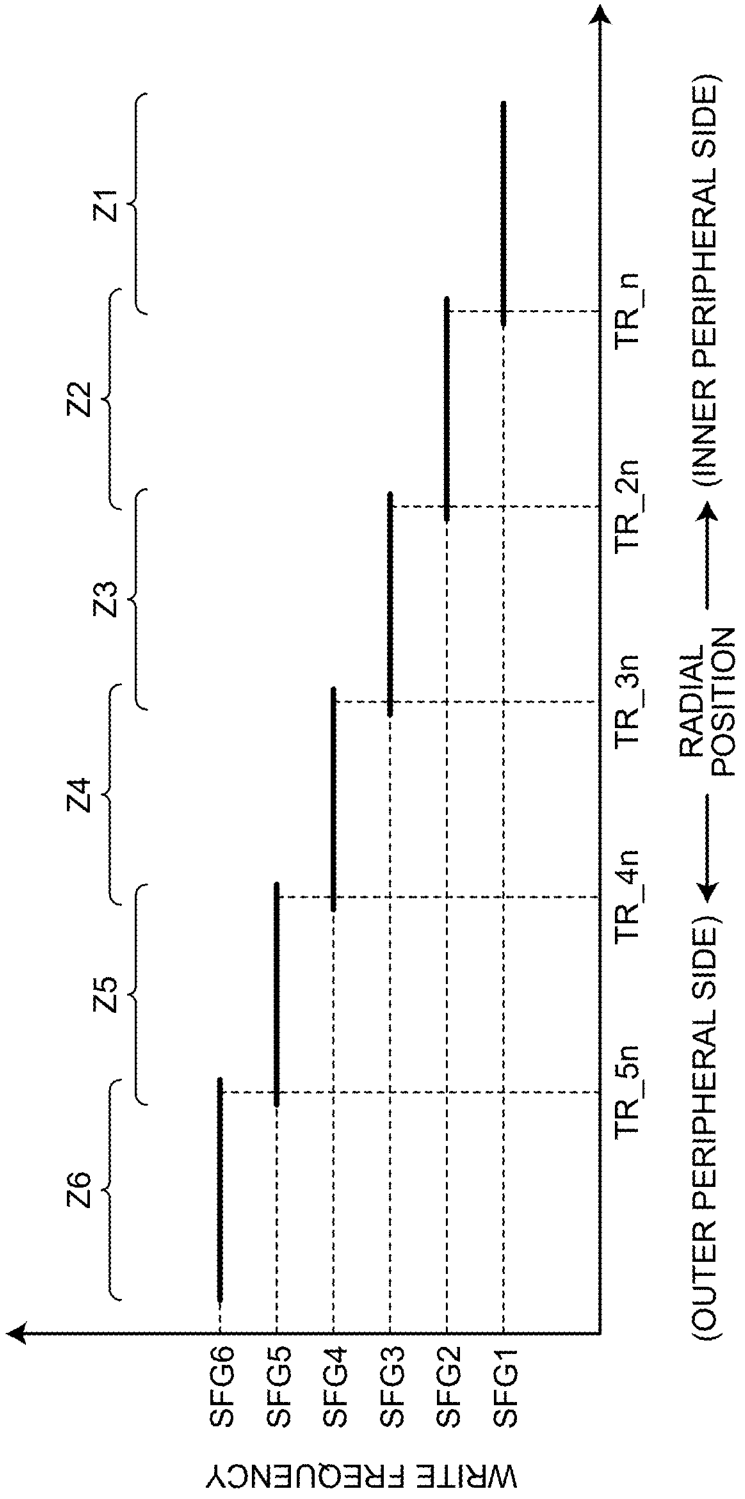
FIG. 3 is a graph illustrating a relationship between radial positions and write frequencies in the embodiment.

For example, as illustrated in FIG. 3, the disk device 1 writes the servo pattern SV at a write frequency SFG1 in the zone Z1. The disk device 1 writes the servo pattern SV at a write frequency SFG2 (>SFG1) in the zone Z2. The disk device 1 writes the servo pattern SV at a write frequency SFG3 (>SFG2) in the zone Z3. The disk device 1 writes the servo pattern SV at a write frequency SFG4 (>SFG3) in the zone Z4. The disk device 1 writes the servo pattern SV at a write frequency SFG5 (>SFG4) in the zone Z5. The disk device 1 writes the servo pattern SV at a write frequency SFG6 (>SFG5) in the zone Z6.

At this time, the disk device 1 has a mixture of the servo pattern SV with the write frequency SFG1 and the servo pattern SV with the write frequency SFG2 at a radial position TR_n of a boundary area between the zones Z1 and Z2. The disk device 1 has a mixture of the servo pattern SV with the write frequency SFG2 and the servo pattern SV with the write frequency SFG3 at a radial position TR_2*n* of a boundary area between the zones Z2 and Z3. The disk device 1 has a mixture of the servo pattern SV with the write frequency SFG3 and the servo pattern SV with the write frequency SFG4 at a radial position TR_3*n* of a boundary area between the zones Z3 and Z4. The disk device 1 has a mixture of the servo pattern SV with the write frequency SFG4 and the servo pattern SV with the write frequency SFG5 at a radial position TR_4*n* of a boundary area between the zones Z4 and Z5. The disk device 1 has a mixture of the servo pattern SV with the write frequency SFG5 and the servo pattern SV with the write frequency SFG6 at a radial position TR_5*n* of a boundary area between the zones Z5 and Z6. Although FIG. 3 illustrates a configuration in which each zone boundary area includes one radial position that is to be a track, each zone boundary area may include multiple radial positions that are to be a track.

In a manufacturing process, blank disk write (BDW) is performed to write a spiral pattern on the disk medium 10. Spiral information of the spiral pattern defines multiple concentric radial positions TR on the disk medium 10. When the zone servo system is employed, the multiple radial positions TR are grouped into multiple zones Z each including one or more radial positions TR.

In a self-servo write (SSW) process of the disk device 1 adopting the zone servo system, the servo patterns SV having different write frequencies SFG are written in the multiple zones Z as illustrated in FIGS. 4A to 4D. FIGS. 4A to 4G are diagrams each illustrating the servo pattern SV in the vicinity of the zone boundary area. In the SSW process, the disk device 1 further writes an erase pattern ER at a circumferential end of each servo pattern SV. The disk device 1 is formed by supplying a radio-frequency current to the write element 12W for magnetic data erasure in the radial direction, that is, by performing AC erasure.

For example, when the zone Z1 includes the radial positions TR_1 to TR_n and the zone Z2 includes the radial positions TR_n to TR_2*n*, the radial position TR_n is the radial position of the zone boundary area. n is an integer of 2 or more.

Figures 4A, 4B, 4C, 4D, 4E, 4F, 4G:
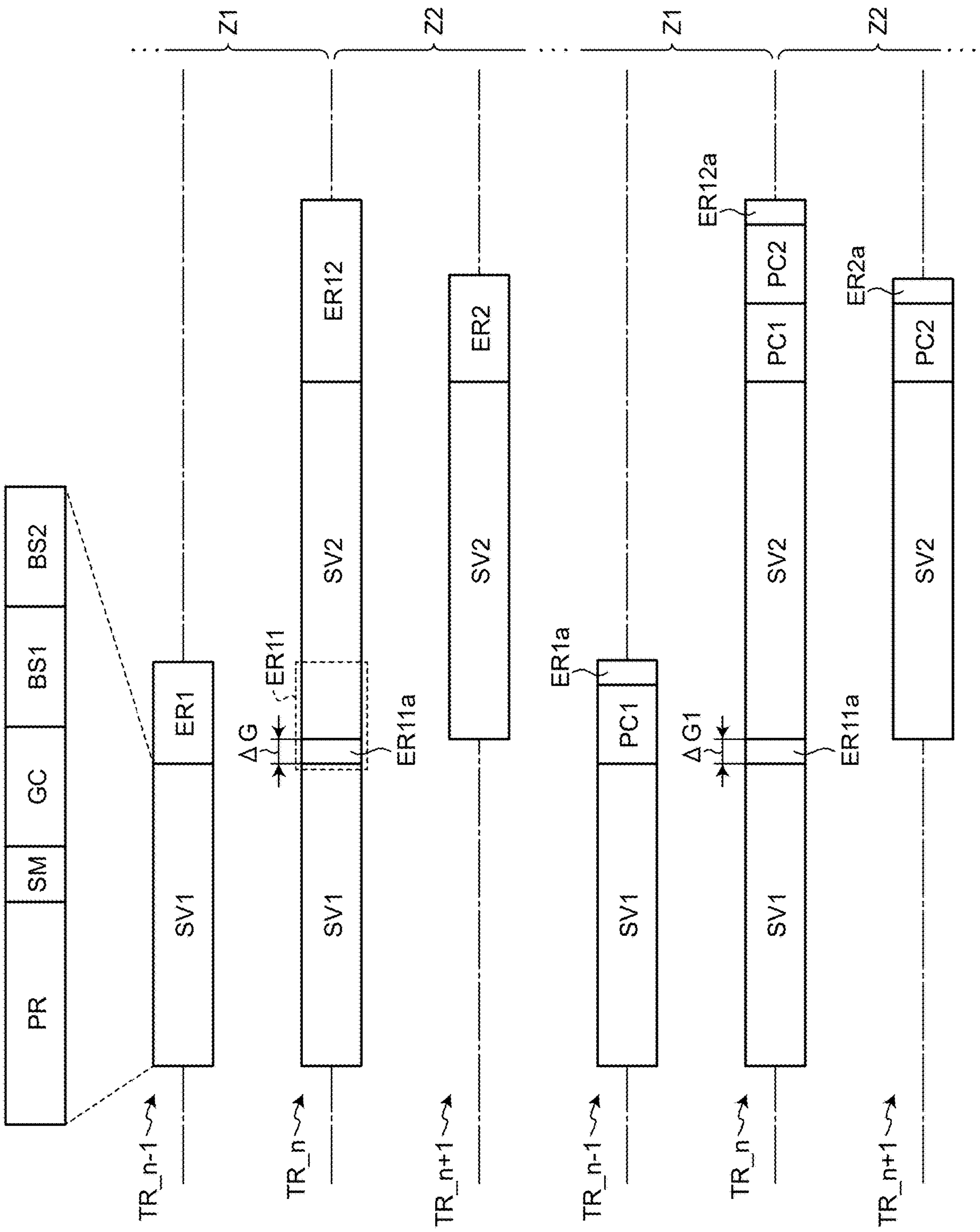
FIGS. 4A to 4G are diagrams each illustrating a servo pattern in the vicinity of a zone boundary area in the embodiment.

As illustrated in FIG. 4C, at the radial position TR_n of the zone boundary area, two types of servo patterns SV1 and SV2 are written with timing circumferentially shifted. Of the two types of servo patterns SV1 and SV2 at the radial position TR_n of the boundary area, the servo pattern SV1 on a circumferentially upstream side may be referred to as a preceding servo pattern, and the servo pattern SV2 on a circumferentially downstream side may be referred to as a succeeding servo pattern.

The disk device 1 writes the preceding servo pattern SV1 at the write frequency SFG1, and writes an erase pattern ER11 represented by a dotted line in FIG. 4C at a circumferential end of the preceding servo pattern SV1. The disk device 1 may write the erase pattern ER11 to have a circumferential length corresponding to a circumferential length of a post code PC. The disk device 1 writes the succeeding servo pattern SV2 at the write frequency SFG2 (>SFG1) to overlap with the erase pattern ER11 from a position separated by a circumferential gap ΔG1 from the circumferential end of the preceding servo pattern SV1, and writes an erase pattern ER12 at a circumferential end of the succeeding servo pattern SV2. Therefore, an erase pattern ER11*a* having the circumferential gap ΔG1 remains between the preceding servo pattern SV1 and the succeeding servo pattern SV2. The disk device 1 may write the erase pattern ER12 to have a circumferential length corresponding to twice the circumferential length of the post code PC.

At this time, at a radial position TR_n−1 on an inner peripheral side, adjacent to the radial position TR_n, the disk device 1 writes the servo pattern SV1 at the write frequency SFG1, and writes the erase pattern ER1 at the circumferential end of the servo pattern SV1, as illustrated in FIG. 4B. The disk device 1 may write the erase pattern ER1 to have a circumferential length corresponding to the circumferential length of the post code PC.

At a radial position TR_n+1 on an outer peripheral side, adjacent to the radial position TR_n, the disk device 1 writes the servo pattern SV2 at the write frequency SFG2, and writes the erase pattern ER2 at the circumferential end of the servo pattern SV2, as illustrated in FIG. 4D. The disk device 1 may write the erase pattern ER2 to have a circumferential length corresponding to the circumferential length of the post code PC.

As illustrated in FIG. 4A, each servo pattern SV written in the SSW process includes a preamble PR, a sync mark SM, a gray code GC, a burst pattern BS1, and a burst pattern BS2, in order in the circumferential direction. The preamble PR is a reference pattern for amplitude and phase synchronization, for the servo pattern SV. The sync mark SM is a pattern indicating a circumferential reference position of the track. The gray code GC includes information (e.g., number) indicating a radial position on the disk medium 10. The burst pattern BS1 and the burst pattern BS2 include, for example, patterns shifted radially from each other to detect an off-track amount of the head 12 from a track center by using both patterns.

After the SSW process, the disk device 1 performs post code write as illustrated in FIGS. 4E to 4G. The post code PC is written over the erase pattern ER. The post code PC includes information about a correction amount (eccentricity correction amount, etc.) for correcting an error in the off-track amount obtained from the burst patterns BS1 and BS2. The erase pattern ER corresponds to the post code PC and has a circumferential length slightly longer than that of the post code PC.

For example, as illustrated in FIG. 4F, the disk device 1 writes multiple post codes PC1 and PC2, in order, over the erase pattern ER12, at the radial position TR_n of the zone boundary area. The post code PC1 corresponds to the servo pattern SV1, and the post code PC2 corresponds to the servo pattern SV2. An erase pattern ER12*a* remains at an end of the post code PC2. As compared with writing the servo pattern SV1, the post code PC1, the servo pattern SV2, and the post code PC2 in order, this configuration makes it possible to reduce a margin area between the post code PC1 and the servo pattern SV2 can be reduced, improving the format efficiency of the servo patterns SV1 and SV2.

At this time, at the radial position TR_n−1 on the inner peripheral side, adjacent to the radial position TR_n, the disk device 1 writes the post code PC1 over the erase pattern ER1, as illustrated in FIG. 4E. Therefore, an erase pattern ER1*a* remains at an end of the post code PC1.

At the radial position TR_n+1 on the outer peripheral side, adjacent to the radial position TR_n, the disk device 1 writes the post code PC2 over the erase pattern ER2, as illustrated in FIG. 4G Therefore, the erase pattern ER2*a* remains at the end of the post code PC2.

FIGS. 4A to 4G illustrate the configurations of the servo patterns in the vicinity of the radial position TR_n of the zone boundary area, but the same applies to the other configurations of the servo patterns in the vicinity of the radial positions TR_2*n*, TR_3*n*, TR_4*n*, and TR_5*n* of other zone boundary areas illustrated in FIG. 2. Furthermore, FIGS. 4A to 4G each illustrate the configurations in which each zone boundary area includes one radial position that is to be a track, but each zone boundary area may include multiple radial positions that is to be a track.

Here, it is considered to equalize the circumferential gaps ΔG between multiple servo patterns SV, between the radial positions TR of the respective zone boundary areas. In the equalization of the circumferential gaps ΔG, the difference in circumferential offset (hereinafter, referred to as RW circumferential offset) between the read element 12R and the write element 12W of the head 12 is also considered, in addition to the difference in the write frequency between the zones. The circumferential offset indicates a spatial deviation in the circumferential direction between a circumferential position of the read element 12R and a circumferential position of the write element 12W, in a state where the head 12 has a predetermined attitude.

In the disk medium 10 illustrated in FIG. 2, an arm angle of the carriage arm 14 changes according to whether the head 12 is positioned at which radial position (any of the radial positions of the radial positions TR_n, TR_2n, TR_3n, TR_4n, and TR_5n), and therefore, a skew angle α of the head 12 changes. Accordingly, a relative positional relationship between the read element 12R and the write element 12W relative to the disk medium 10 also changes, and therefore, an RW circumferential offset OF also changes.

Figures 5A, 5B, 5C:
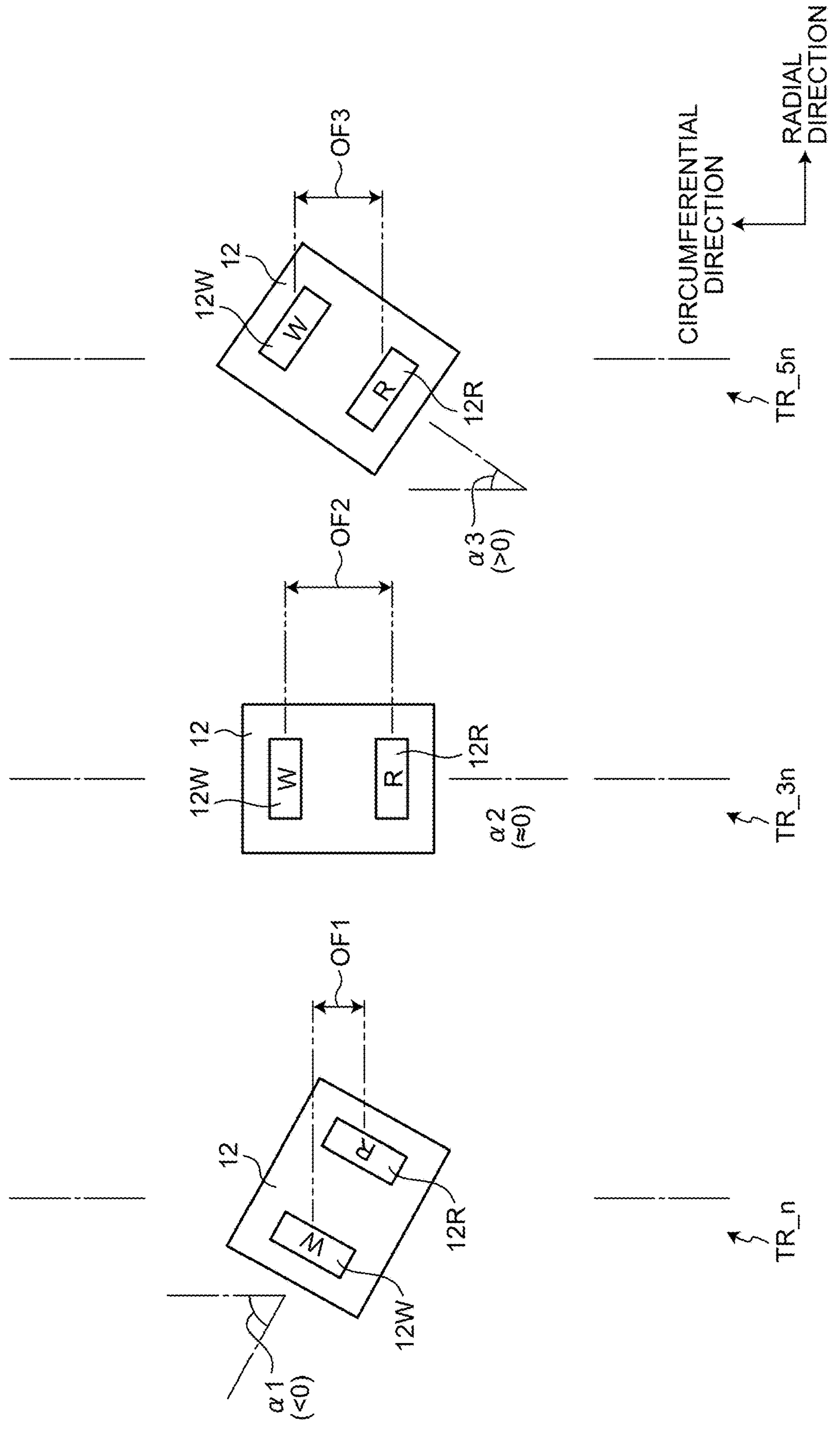
FIGS. 5A to 5C are diagrams each illustrating a relationship between a radial position and an attitude of a head in the embodiment.

When the head 12 positioned at the radial position TR_n of the boundary area between the zones Z1 and Z2 during tracking is viewed from the side of the disk medium 10, the read element 12R and the write element 12W have a positional relationship as illustrated in FIG. 5A. In other words, the skew angle α has a negative angle α1 (<0) inclined toward the inner peripheral side, and the RW circumferential offset OF has a relatively small value OF1. FIGS. 4A to 4G are diagrams illustrating a relationship between a radial position and an attitude of the head 12.

When the head 12 positioned at the radial position TR_3n of the boundary area between the zones Z3 and Z4 during tracking is viewed from the side of the disk medium 10, the read element 12R and the write element 12W have a positional relationship as illustrated in FIG. 5B. In other words, the skew angle α has a value α2 (≈0) of substantially zero, and the RW circumferential offset OF has a relatively large value OF2 (>OF1).

When the head 12 positioned at the radial position TR_5n of the boundary area between the zones Z5 and Z6 during tracking is viewed from the side of the disk medium 10, the read element 12R and the write element 12W have a positional relationship as illustrated in FIG. 5C. In other words, the skew angle α has a positive angle α3 (>0) inclined toward the outer peripheral side, and the RW circumferential offset OF has a relatively small value OF3 (<OF2).

Figure 6:
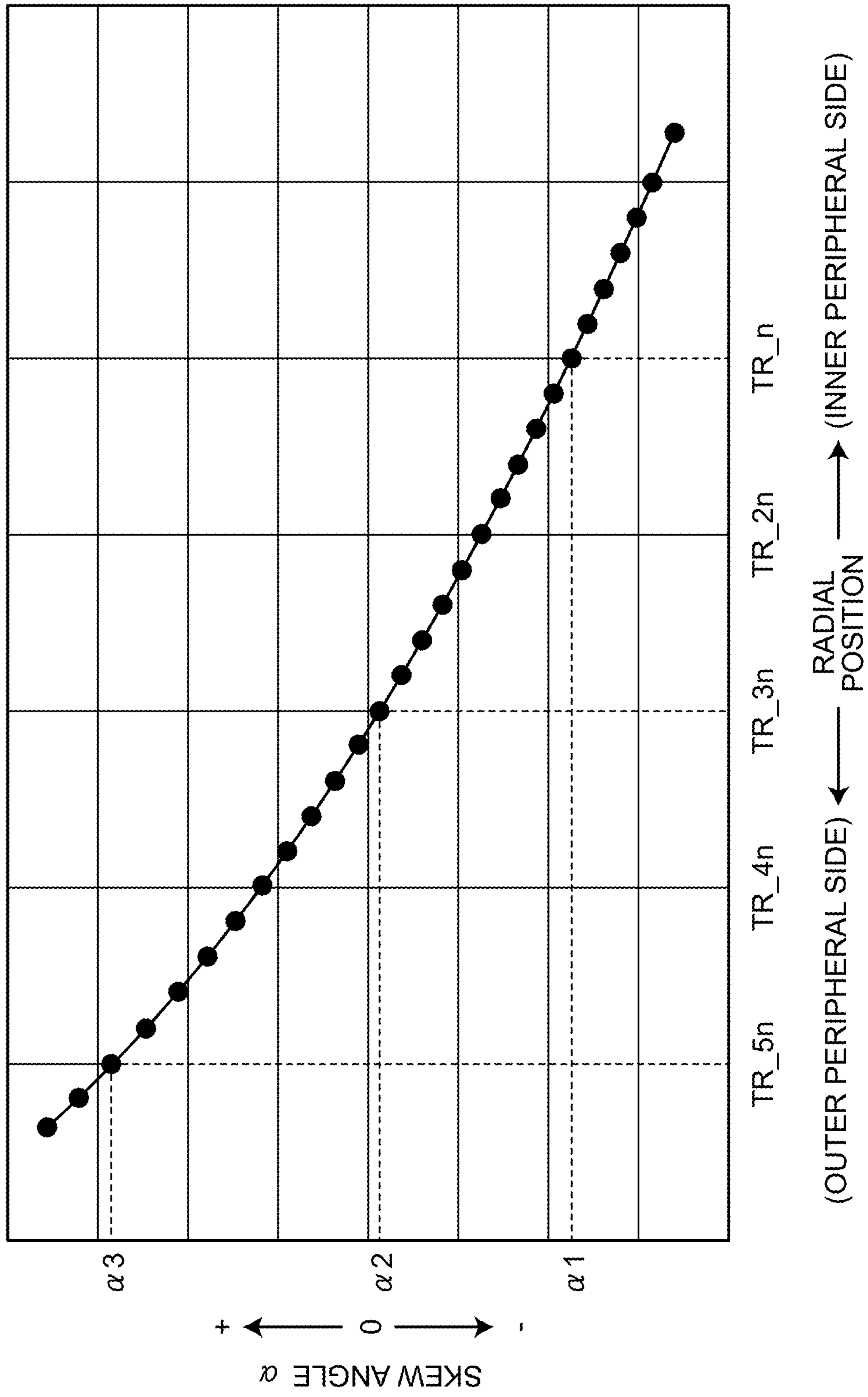
FIG. 6 is a graph illustrating a relationship between the radial positions and skew angles in the embodiment.
Figure 7:
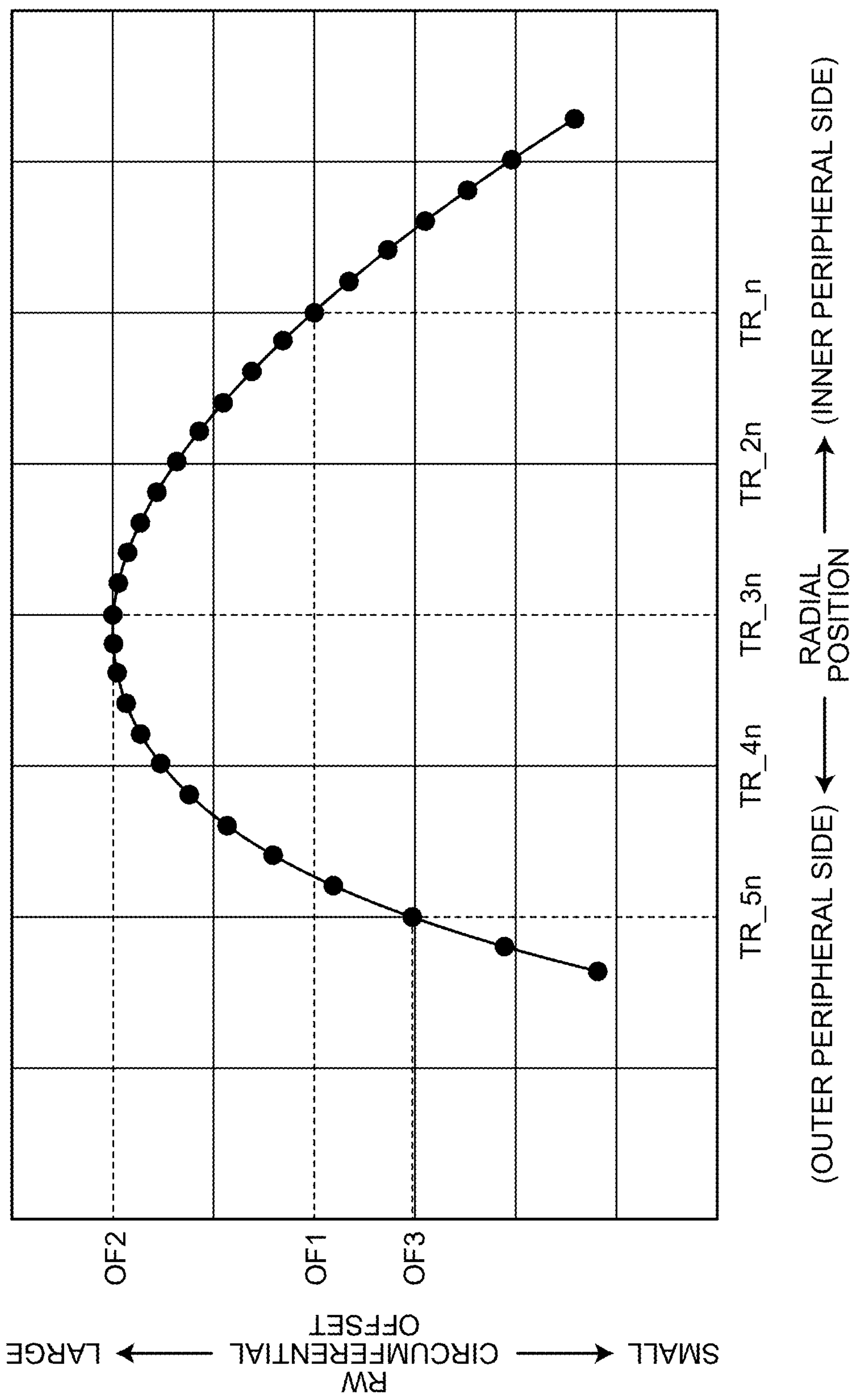
FIG. 7 is a graph illustrating a relationship between the radial positions and RW circumferential offsets in the embodiment.

FIG. 6 is a graph summarizing the relationships between the radial positions and the skew angles α illustrated in FIGS. 5A to 5C according to the radial position, and FIG. 7 is a graph summarizing the relationships between the radial positions and the RW circumferential offsets OF illustrated in FIGS. 5A to 5C according to the radial position. FIG. 6 is a graph illustrating a relationship between the radial positions and the skew angles α. FIG. 7 is a graph illustrating a relationship between the radial positions and the RW circumferential offsets OF.

As illustrated in FIG. 6, the skew angle α can monotonically change relative to a change in the radial position. As the radial position is shifted from the outer peripheral side to the inner peripheral side, the skew angle α can monotonically decrease in the positive region, become substantially zero near the radial position TR_3n, and monotonically decrease in the negative region.

As illustrated in FIG. 7, the RW circumferential offset changes into a curve with respect to a change in the radial position. As the radial position is shifted from the outer peripheral side to the inner peripheral side, the RW circumferential offset gradually increases, has a peak near the radial position TR_3n, and gradually decreases.

Figure 8:
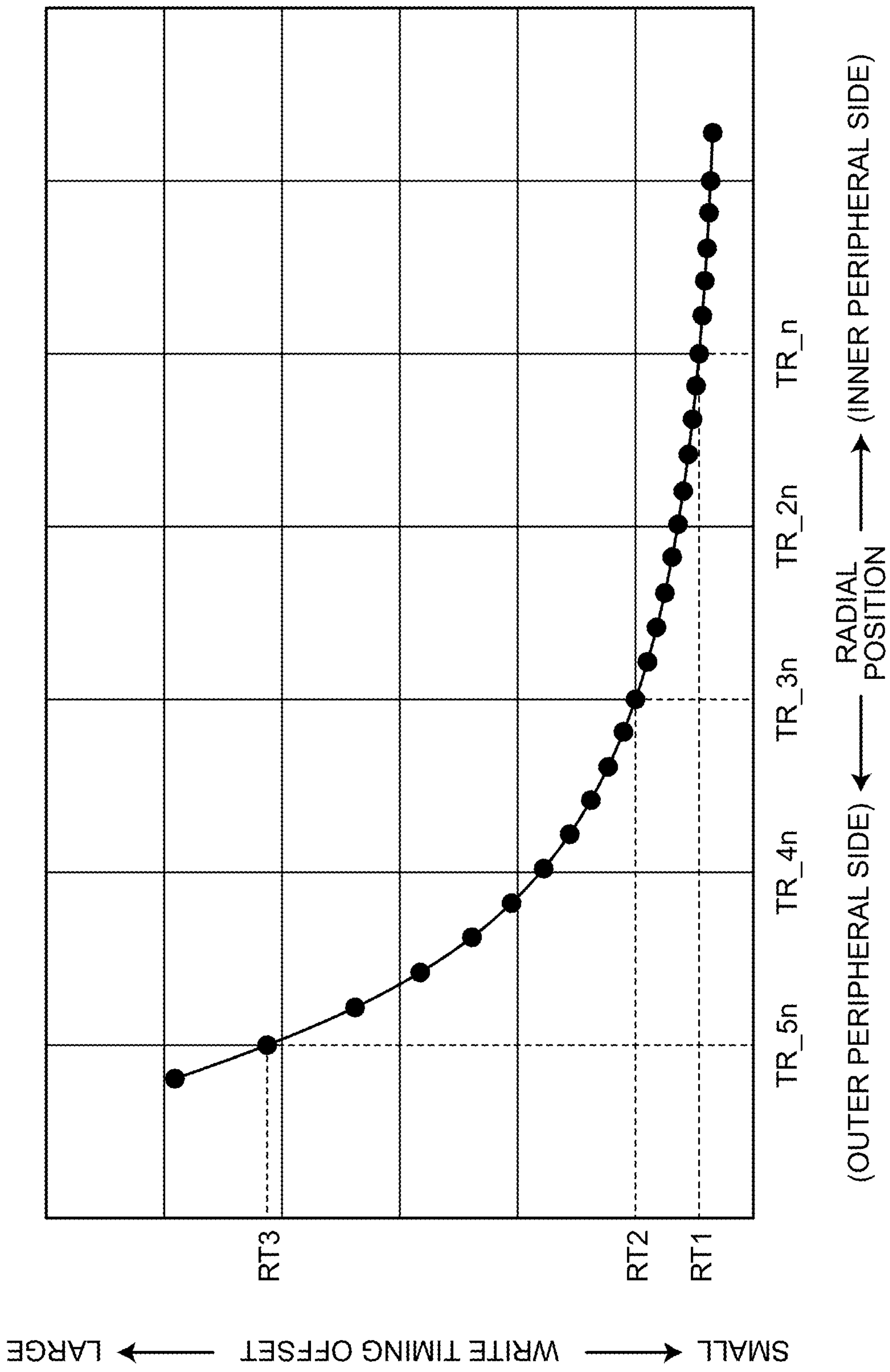
FIG. 8 is a graph illustrating a relationship between the radial positions and write timing offsets in the embodiment.

For example, in the disk device 1, the controller 130 may experimentally acquire and store the relationship between the radial positions illustrated in FIG. 6 in advance. In the controller 130, the relationship between the radial positions and the write frequencies illustrated in FIG. 3 and the relationship between the radial positions and the skew angles α illustrated in FIG. 6 can be used to obtain the relationship between the radial positions and the RW circumferential offsets OF illustrated in FIG. 7. The controller 130 is configured to use the relationship between the radial positions and the write frequencies illustrated in FIG. 3 and the relationship between the radial positions and the RW circumferential offsets OF illustrated in FIG. 7 to calculate influence of time during one rotation by the SPM 11. In the controller 130, a write timing offset for each of the radial positions as illustrated in FIG. 8 can be obtained according to a result of the calculation. FIG. 8 is a graph illustrating a relationship between the radial positions and the write timing offsets. The write timing offset indicates a time difference in write timing.

The controller 130 uses a measurement result of the RW circumferential offset with the device mounted, in consideration of variations in dimension of each device to calculate the write timing offset for each radial position, but the write timing offset may be calculated from theoretical values of mechanical dimensions. The controller 130 generates the timing correction data according to the write timing offset for each radial position and stores the timing correction data in a management information storage area. The management information storage area is a storage area to store management information, and may be provided in the non-volatile memory 80 or may be provided in the disk medium 10. The controller 130 may read the timing correction data for each radial position from the management information storage area upon SSW in each zone to correct write start timing for each servo pattern according to the timing correction data. Alternatively, the controller 130 may sequentially learn the write start timing for the servo pattern in the same zone to correct the write start timing separately from the timing correction of the present proposal.

Next, a manufacturing method for the disk device 1 will be described. In the manufacturing method for the disk device 1, a blank disk write (BDW) process, the self-servo write (SSW) process, and a post code write process are sequentially performed.

In the BDW process, the disk medium 10 that is blank is mounted on the housing of the disk device 1, and the disk device 1 is assembled. The disk device 1 writes the spiral pattern on the disk medium 10 that is blank.

Figure 9:
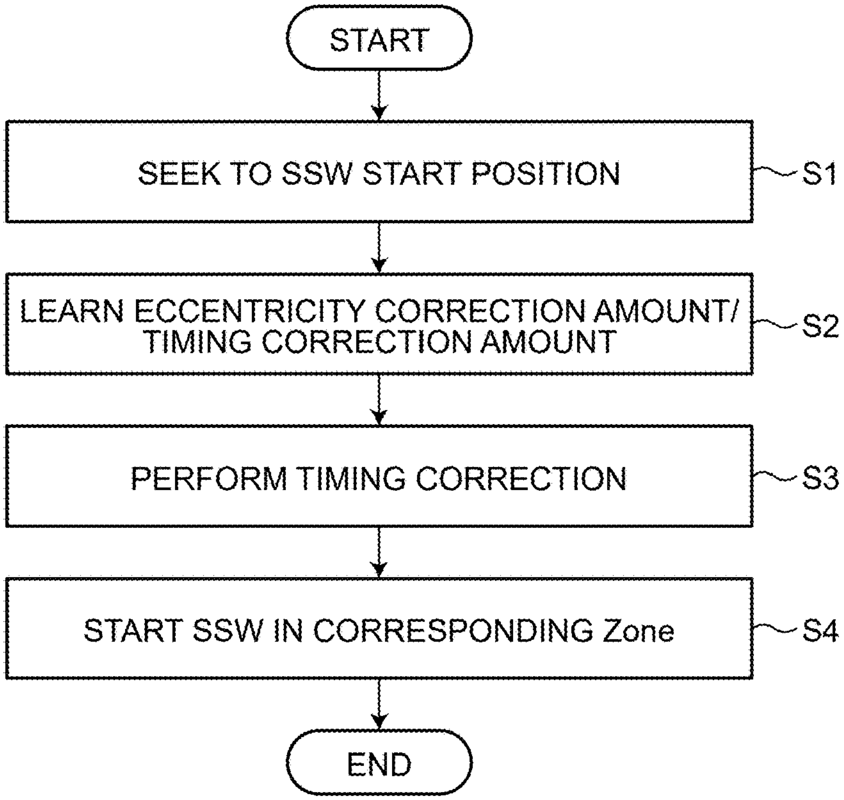
FIG. 9 is a flowchart illustrating a process of self-servo write in the embodiment.

In the SSW process, the disk device 1 writes the servo pattern SV by using the spiral pattern as illustrated in FIG. 9. FIG. 9 is a flowchart illustrating a process of self-servo write.

The disk device 1 causes the head 12 to seek to an SSW start position (S1).

For example, the disk device 1 selects a write target zone Z from the multiple zones Z1 to Z6. The disk device 1 sets a representative radial position TR in the write target zone Z as the SSW start position. The representative radial position TR may be the first radial position TR in the write target zone Z. The disk device 1 causes the head 12 to seek to the representative radial position TR by using the spiral pattern.

The disk device 1 learns the eccentricity correction amount and a timing correction amount (S2).

For example, the disk device 1 uses an acceleration sensor or the like provided at the housing to measure a rotation synchronous component of the housing, obtains the eccentricity correction amount according to a result of the measurement, and holds the eccentricity correction amount in association with a current radial position. Thus, the disk device 1 learns the eccentricity correction amount.

Figure 10:
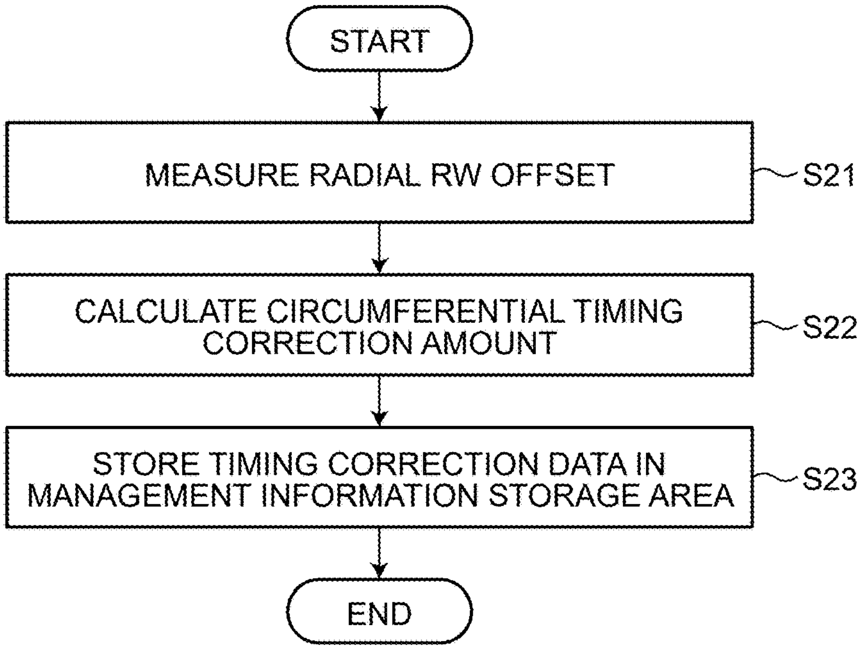
FIG. 10 is a flowchart illustrating a process of learning of a timing correction amount in the embodiment.

Furthermore, the disk device 1 learns the timing correction amount, as illustrated in FIG. 10. FIG. 10 is a flowchart illustrating a process of learning of the timing correction amount.

The disk device 1 entirely measures a radial RW offset RF for the disk medium 10 (S21).

For example, in the disk device 1, the controller 130 selects a radial position TR to be measured from the multiple radial positions TR in the write target zone Z, and performs positioning control of the write element 12W to a radial center of the selected radial position TR. The controller 130 writes a predetermined pattern with the write element 12W while causing the write element 12W to track the radial center of the selected radial position TR. The controller 130 alternately repeats radial shifting of the head 12 and reading with the read element 12R. When the predetermined pattern is read, the controller 130 sets the total shift amount in the radial direction of the head 12 as the radial RW offset RF. The controller 130 performs this measurement for each of the multiple radial positions TR.

The disk device 1 calculates a circumferential timing correction amount by using a result of the measurement in S21 (S22).

For example, the controller 130 accesses the management information storage area, refers to the relationship between the radial positions and the skew angles α (see FIG. 6) to obtain the skew angle α for each radial position TR. The controller 130 obtains the RW circumferential offset OF using the skew angle α and the result of the measurement in S21. When α≠0, the controller 130 is allowed to convert the radial RW offset RF measured in S21 to the RW circumferential offset OF by the following Formula 1.

$$OF=RF/(\tan\alpha) \quad \text{Formula 1}$$

When α≈0, the controller 130 is allowed to set a distance between the write element 12W and the read element 12R in an XY plane direction as the RW circumferential offset OF without using the radial RW offset RF measured in S21 (see FIG. 5B).

Therefore, in the controller 130, the relationship between the radial positions and the RW circumferential offsets OF as illustrated in FIG. 7 can be obtained.

The controller 130 accesses the management information storage area, refers to the relationship between the radial positions and the write frequencies (see FIG. 3) to obtain the write frequency SFG for each radial position TR. At this time, for the radial positions TR_n, TR_2*n*, TR_3*n*, TR_4*n*, and TR_5*n* of the zone boundary areas, the controller 130 may adopt, as the write frequency SFG, a value of any of the write frequencies SFG of the multiple servo patterns SV or an average value of the write frequencies SFG of the multiple servo patterns SV.

The controller 130 uses the write frequency SFG to obtain a write timing offset RT for each radial position TR. The controller 130 is allowed to convert the RW circumferential offset OF to the write timing offset RT by the following Formula 2.

$$RT=(\Delta G+OF)/(SFG\times K) \quad \text{Formula 2}$$

In Formula 2, ΔG is a target value of a circumferential gap between the servo patterns SV. K is a coefficient for converting a frequency to a velocity, and can be experimentally determined in advance.

At this time, a reference zone Z may be determined, and an error in the write timing offset RT from the reference zone Z may be set as a write timing offset correction amount ΔRT of a zone Z other than the reference zone.

For example, when the zone Z1 is set as the reference zone, the disk device 1 sets a write timing offset RT 1 of the first radial position TR_1 of the zone Z1 as a reference write timing offset.

In the disk device 1, a write timing offset correction amount ΔRT_n can be obtained by the following Formula 3, for a write timing offset RT_n of the succeeding servo pattern SV at the radial position TR_n of the boundary area between the zones Z1 and Z2

$$\Delta RT\_n=RT\_n-RT\_1 \quad \text{Formula 3}$$

In the disk device 1, a write timing offset correction amount ΔRT_2*n* can be obtained by the following Formula 4, for a write timing offset RT_2*n* of the succeeding servo pattern SV at the radial position TR_2*n* of the boundary area between the zones Z2 and Z3.

$$\Delta RT\_2n=RT\_2n-RT\_1 \quad \text{Formula 4}$$

In the disk device 1, a write timing offset correction amount ΔRT_3*n* can be obtained by the following Formula 5, for a write timing offset RT_3*n* of the succeeding servo pattern SV at the radial position TR_3*n* of the boundary area between the zones Z3 and Z4.

$$\Delta RT\_3n=RT\_3n-RT\_1 \quad \text{Formula 5}$$

In the disk device 1, a write timing offset correction amount ΔRT_4*n* can be obtained by the following Formula 6, for a write timing offset RT_4*n* of the succeeding servo pattern SV at the radial position TR_4*n* of the boundary area between the zones Z4 and Z5.

$$\Delta RT\_4n=RT\_4n-RT\_1 \quad \text{Formula 6}$$

In the disk device 1, a write timing offset correction amount ΔRT_5*n* can be obtained by the following Formula 7, for a write timing offset RT_5*n* of the succeeding servo pattern SV at the radial position TR_5*n* of the boundary area between the zones Z5 and Z6.

$$\Delta RT\_5n=RT\_5n-RT\_1 \quad \text{Formula 7}$$

Therefore, in the controller 130, the write timing offset correction amount ΔRT can be obtained as the circumferential timing correction amount.

The disk device 1 uses the circumferential timing correction amount obtained in S22 to generate the timing correction data, and stores the timing correction data in the management information storage area (S23).

For example, the controller 130 uses the write timing offset correction amount ΔRT obtained in S22 to generate the timing correction data for each radial position TR. The controller 130 generates the timing correction data in which identification information (e.g., number) of the radial position TR and the write timing offset correction amount ΔRT are associated with each other, for each of the multiple radial positions TR. The controller 130 stores the timing correction data in the management information storage area.

Returning to FIG. 9, the disk device 1 performs timing correction by using the timing correction amount learned in S22 (S3). The disk device 1 adds a calculated circumferential timing offset RT to a baseline of a write timing training value (timing correction data) in a time direction updated at the start of SSW, and corrects the timing in the entire zones so that a deviation does not occur in the zone boundary areas.

For example, the disk device 1 reads the timing correction data generated in S23 from the management information storage area, and specifies the timing correction amount for each of the radial positions TR_n, TR_2*n*, TR_3*n*, TR_4*n*, and TR_5*n* of the zone boundary areas. The disk device 1 uses the specified timing correction amount to correct the write start timing for the preceding servo pattern SV and/or the succeeding servo pattern SV.

When the zone Z1 is set as the reference zone, the disk device 1 specifies the write timing offset correction amount ΔRT_n, for the radial position TR_n of the boundary area between the zones Z1 and Z2. The disk device 1 uses the write timing offset correction amount ΔRT_n to correct the write start timing for the succeeding servo pattern SV, for the radial position TR_n of the boundary area between the zones Z1 and Z2. The disk device 1 sets the timing obtained by adding the write timing offset correction amount ΔRT_n to the baseline of the write timing training value, as the write start timing for the succeeding servo pattern SV. The disk device 1 uses the write timing offset correction amount ΔRT_n to correct the write start timing for the servo pattern SV, also for the radial positions TR_n+1 to TR_2*n*−1 of the zone Z2. The disk device 1 sets the timing obtained by adding the write timing offset correction amount ΔRT_n to the baseline of the write timing training value, as the write start timing for the servo pattern SV.

The disk device 1 specifies the write timing offset correction amount ΔRT_2*n*, for the radial position TR_2*n* of the boundary area between the zones Z2 and Z3. The disk device 1 uses the write timing offset correction amount ΔRT_2*n* to correct the write start timing for the preceding servo pattern SV, and uses the write timing offset correction amount ΔRT_n to correct the write start timing for the succeeding servo pattern SV, for the radial position TR_2*n* of the boundary area between the zones Z2 and Z3. The disk device 1 sets the timing obtained by adding the write timing offset correction amount ΔRT_2*n* to the baseline of the write timing training value, as the write start timing for the preceding servo pattern SV, and sets the timing obtained by adding the write timing offset correction amount ΔRT_n to the baseline of the write timing training value, as the write start timing for the succeeding servo pattern SV. The disk device 1 uses the write timing offset correction amount ΔRT_2*n* to correct the write start timing for the servo pattern SV, also for the radial positions TR_2*n*+1 to TR_3*n*−1 of the zone Z3. The disk device 1 sets the timing obtained by adding the write timing offset correction amount ΔRT_2*n* to the baseline of the write timing training value, as the write start timing for the servo pattern SV.

The disk device 1 specifies the write timing offset correction amount ΔRT_3*n*, for the radial position TR_3*n* of the boundary area between the zones Z3 and Z4. The disk device 1 uses the write timing offset correction amount ΔRT_2*n* to correct the write start timing for the preceding servo pattern SV, and uses the write timing offset correction amount ΔRT_3*n* to correct the write start timing for the succeeding servo pattern SV, for the radial position TR_3*n* of the boundary area between the zones Z3 and Z4. The disk device 1 sets the timing obtained by adding the write timing offset correction amount ΔRT_3*n* to the baseline of the write timing training value, as the write start timing for the preceding servo pattern SV, and sets the timing obtained by adding the write timing offset correction amount ΔRT_2*n* to the baseline of the write timing training value, as the write start timing for the succeeding servo pattern SV. The disk device 1 uses the write timing offset correction amount ΔRT_3*n* to correct the write start timing for the servo pattern SV, also for the radial positions TR_3*n*+1 to TR_4*n*−1 of the zone Z4. The disk device 1 sets the timing obtained by adding the write timing offset correction amount ΔRT_3*n* to the baseline of the write timing training value, as the write start timing for the servo pattern SV.

The disk device 1 specifies the write timing offset correction amount ΔRT_4*n*, for the radial position TR_4*n* of the boundary area between the zones Z4 and Z5. The disk device 1 uses the write timing offset correction amount ΔRT_4*n* to correct the write start timing for the preceding servo pattern SV, and uses the write timing offset correction amount ΔRT_3*n* to correct the write start timing for the succeeding servo pattern SV, for the radial position TR_4*n* of the boundary area between the zones Z4 and Z5. The disk device 1 sets the timing obtained by adding the write timing offset correction amount ΔRT_4*n* to the baseline of the write timing training value, as the write start timing for the preceding servo pattern SV, and sets the timing obtained by adding the write timing offset correction amount ΔRT_3*n* to the baseline of the write timing training value, as the write start timing for the succeeding servo pattern SV. The disk device 1 uses the write timing offset correction amount ΔRT_4*n* to correct the write start timing for the servo pattern SV, also for the radial positions TR_4*n*+1 to TR_5*n*−1 of the zone Z5. The disk device 1 sets the timing obtained by adding the write timing offset correction amount ΔRT_4*n* to the baseline of the write timing training value, as the write start timing for the servo pattern SV.

The disk device 1 specifies the write timing offset correction amount ΔRT_5*n*, for the radial position TR_5*n* of the boundary area between the zones Z5 and Z6. The disk device 1 uses the write timing offset correction amount ΔRT_5*n* to correct the write start timing for the preceding servo pattern SV, and uses the write timing offset correction amount ΔRT_4*n* to correct the write start timing for the succeeding servo pattern SV, for the radial position TR_5*n* of the boundary area between the zones Z5 and Z6. The disk device 1 sets the timing obtained by adding the write timing offset correction amount ΔRT_5*n* to the baseline of the write timing training value, as the write start timing for the preceding servo pattern SV, and sets the timing obtained by adding the write timing offset correction amount ΔRT_4*n* to the baseline of the write timing training value, as the write start timing for the succeeding servo pattern SV. The disk device 1 uses the write timing offset correction amount ΔRT_5*n* to correct the write start timing for the servo pattern SV, also for the radial positions TR_5*n*+1 to TR 6*n*−1 of the zone Z6. The disk device 1 sets the timing obtained by adding the write timing offset correction amount ΔRT_5*n* to the baseline of the write timing training value, as the write start timing for the servo pattern SV.

The disk device 1 starts SSW in the corresponding zone Z while using a result of the correction in S3 (S4).

Figure 11:
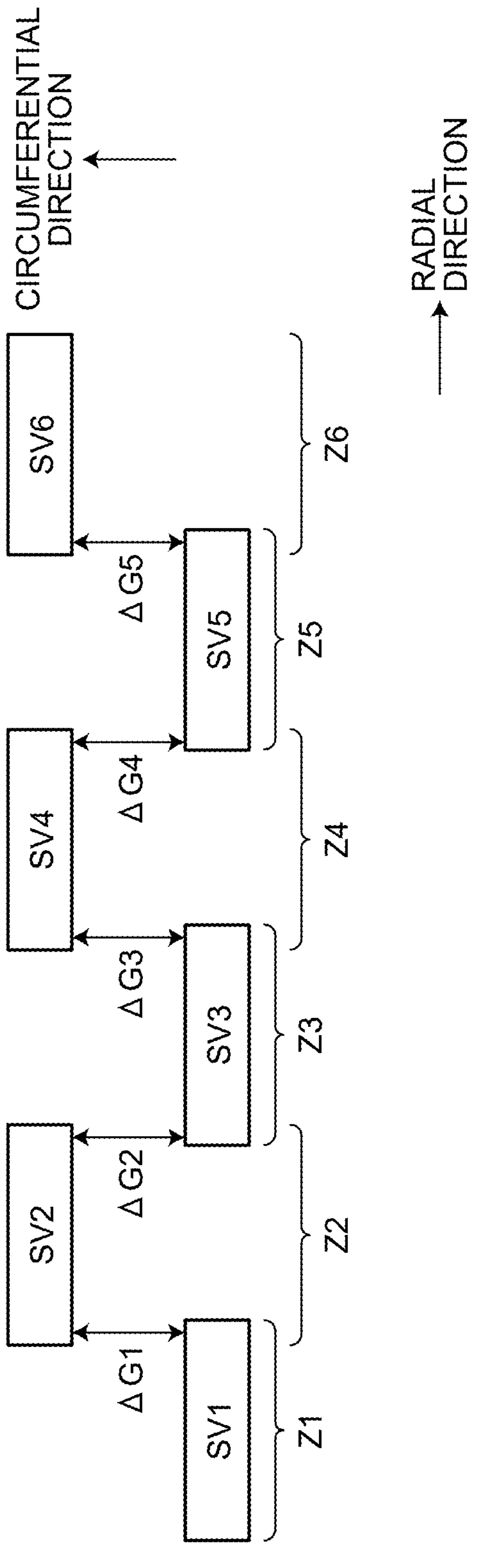
FIG. 11 is a diagram illustrating circumferential gaps between two servo patterns in the zone boundary areas in the embodiment.

For example, as illustrated in FIG. 11, the disk device 1 writes the servo pattern SV1 at timing according to the write timing offset RT, for the radial positions TR_1 to TR_n−1 of the zone Z1. FIG. 11 is a diagram illustrating the circumferential gaps ΔG between two servo patterns SV in the zone boundary areas.

The disk device 1 writes the preceding servo pattern SV1 at timing according to the write timing offset RT, and writes the succeeding servo pattern SV2 at timing corrected with the write timing offset correction amount ΔRT_n, for the radial position TR_n of the boundary area between the zones Z1 and Z2. Therefore, the circumferential gap ΔG1 adjusted is provided between the servo patterns SV1 and SV2.

The disk device 1 writes the servo pattern SV2 at the timing corrected with the write timing offset correction amount ΔRT_n, for the radial positions TR_n+1 to TR_2*n*−1 in the zone Z2.

The disk device 1 writes a preceding servo pattern SV3 at timing corrected with the write timing offset correction amount ΔRT_2n, and writes the succeeding servo pattern SV2 at the timing corrected with the write timing offset correction amount ΔRT_n, for the radial position TR_2n of the boundary area between the zones Z2 and Z3. Therefore, a circumferential gap ΔG2 (≈ΔG1) adjusted is provided between the servo patterns SV3 and SV2.

The disk device 1 writes the servo pattern SV3 at the timing corrected with the write timing offset correction amount ΔRT_2n, for the radial positions TR_2n+1 to TR_3n−1 in the zone Z3.

The disk device 1 writes the preceding servo pattern SV3 at the timing corrected with the write timing offset correction amount ΔRT_2n, and writes a succeeding servo pattern SV4 at timing corrected with the write timing offset correction amount ΔRT_3n, for the radial position TR_3n of the boundary area between the zones Z3 and Z4. Therefore, a circumferential gap ΔG3 (≈ΔG1) adjusted is provided between the servo patterns SV3 and SV4.

The disk device 1 writes the servo pattern SV4 at the timing corrected with the write timing offset correction amount ΔRT_3n, for the radial positions TR_3n+1 to TR_4n−1 in the zone Z4.

The disk device 1 writes a preceding servo pattern SV5 at timing corrected with the write timing offset correction amount ΔRT_4n, and writes the succeeding servo pattern SV4 at the timing corrected with the write timing offset correction amount ΔRT_3n, for the radial position TR_4n of the boundary area between the zones Z4 and Z5. Therefore, a circumferential gap ΔG4 (≈ΔG1) adjusted is provided between the servo patterns SV5 and SV4.

The disk device 1 writes the servo pattern SV5 at the timing corrected with the write timing offset correction amount ΔRT_4n, for the radial positions TR_4n+1 to TR_5n−1 in the zone Z5.

The disk device 1 writes the preceding servo pattern SV5 at the timing corrected with the write timing offset correction amount ΔRT_4n, and writes a succeeding servo pattern SV6 at timing corrected with the write timing offset correction amount ΔRT_5n, for the radial position TR_5n of the boundary area between the zones Z5 and Z6. Therefore, a circumferential gap ΔG5 (≈ΔG1) adjusted is provided between the servo patterns SV5 and SV6

The disk device 1 writes the servo pattern SV6 at the timing corrected with the write timing offset correction amount ΔRT_5n, for the radial positions TR_5n+1 to TR 6n−1 in the zone Z6.

As illustrated in FIG. 11, the respective zone boundary areas can have equal circumferential gaps ΔG between the servo patterns.

As described above, in the present embodiment, the disk device 1 is configured so that at a position circumferentially shifted from one servo pattern of the two servo patterns SV in a track of a boundary area between zones Z according to the timing correction data, the controller 130 writes the other servo pattern of the two servo patterns SV. This configuration makes it possible to equalize the circumferential gaps ΔG between the two servo patterns SV in the tracks of the boundary areas between the zones Z, a large area can be secured to record data, improving the format efficiency.

Note that the disk device 1 may experimentally acquire RW offset information indicating a relationship between the radial positions in the disk medium 10 and the radial RW offsets RF in advance and store the RW offset information in the management information storage area. In the RW offset information, the radial position and the radial RW offset RF are associated with each other, for multiple radial positions. In this configuration, in S21 of FIG. 10, the disk device 1 can read the RW offset information from the management information storage area, instead of performing the measurement, to acquire the radial RW offset RF for each of the multiple radial positions TR. The controller may acquire the RW offset information to generate the timing correction data according to the radial position of the boundary area and the RW offset information.

Alternatively, the disk device 1 may experimentally acquire the timing correction amount of each radial position in advance and store the timing correction amount in the management information storage area. In this configuration, prior to S1 of FIG. 9, the processing of S21 to S23 of FIG. 10 is performed for the disk device that is manufactured under a standard manufacturing condition so that the timing correction data is stored in the management information storage area. In this configuration, in S2 of FIG. 9, the disk device 1 can read the timing correction data from the management information storage area, instead of performing learning, to acquire the timing correction amount of each radial position.

Figures 12A, 12B:
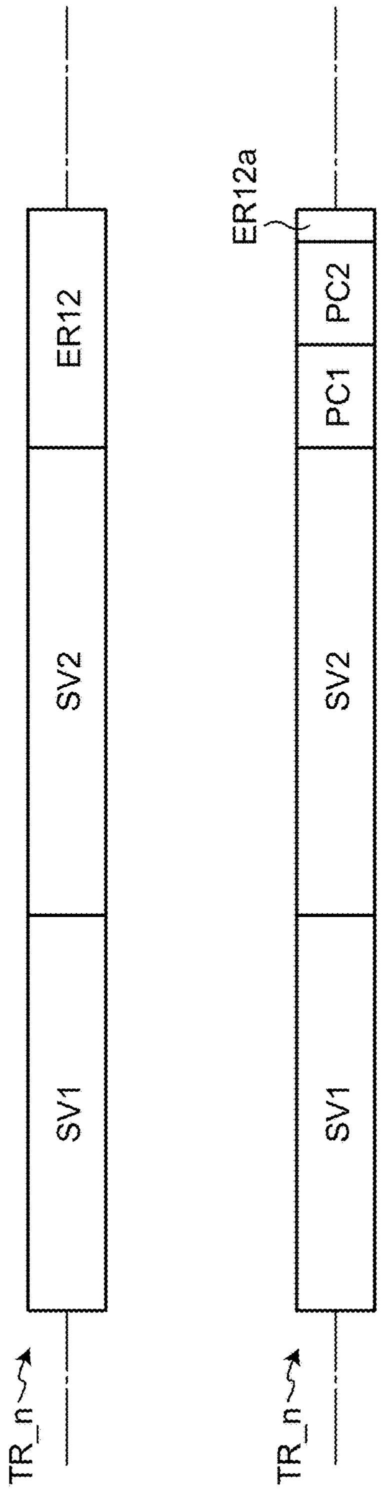
FIGS. 12A and 12B are diagrams each illustrating a servo pattern in a zone boundary area in a modification of the embodiment.

Alternatively, as a modification of the embodiment, the disk device 1 may write two servo patterns SV in the track of a boundary area between zones Z circumferentially continuously, as illustrated in FIGS. 12A and 12B.

For example, in S2 of FIG. 9, the timing correction amount for two circumferentially continuous servo patterns SV in a track of a boundary area between zones Z is learned. In this configuration, in S22 of FIG. 10, for example, when ΔG=0 in Formula 2, the RW circumferential offset OF can be converted to the write timing offset RT. The other processing is similar to those in the embodiment.

Therefore, in the SSW process, the disk device 1 writes the preceding servo pattern SV1 and the succeeding servo pattern SV2 circumferentially continuously at the radial position TR_n of the zone boundary area, as illustrated in FIG. 12A. The disk device 1 writes the preceding servo pattern SV1 at the write frequency SFG1. The disk device 1 writes the succeeding servo pattern SV2 at the write frequency SFG2 (>SFG1) from the circumferential end of the preceding servo pattern SV1. The disk device 1 writes the erase pattern ER12 at the circumferential end of the succeeding servo pattern SV2.

In the post code write process, the disk device 1 further writes the post code PC1 and the post code PC2 circumferentially continuously at the radial position TR_n of the zone boundary area as illustrated in FIG. 12B. The disk device 1 sequentially writes the multiple post codes PC1 and PC2 over the erase pattern ER12. An erase pattern ER12a remains at an end of the post code PC2.

In this way, in the modification of the embodiment, in the disk device 1, the controller 130 writes the other servo pattern of the two servo patterns SV, at a position circumferentially continued from one servo pattern of the two servo patterns SV in a track of a boundary area between zones Z, according to the timing correction data. This configuration makes it possible to reduce, to substantially zero, the circumferential gaps ΔG between the two servo patterns SV in the tracks of the boundary areas between the zones Z, a large area can be secured to record data, improving the format efficiency.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A disk device comprising:

a head;

a disk medium that includes multiple zones concentrically provided; and a controller that, when two servo patterns corresponding to two adjacent zones are written by the head on a track of a boundary area between the two adjacent zones of the multiple zones, generates timing correction data according to a radial position of the boundary, that writes one servo pattern of the two servo patterns on the track of the boundary area, and that writes the other servo pattern of the two servo patterns, at a position circumferentially shifted from the one servo pattern in the track of the boundary area, according to the timing correction data, where in the head includes a read element and a write element, and the controller, when the two servo patterns corresponding to the two zones are written on the track of the boundary area by the write element, generates the timing correction data according to circumferential offsets of the read element and the write element at the radial position of the boundary area.

2. The disk device according to claim 1, wherein the controller, when the two servo patterns corresponding to the two zones are written on the track of the boundary area by the write element, corrects write start timing according to the timing correction data, and writes the other servo pattern on the track of the boundary area in synchronization with the corrected write start timing.

3. The disk device according to claim 2, wherein the controller, when one servo pattern corresponding to a zone is written on another track other than the track of the boundary area in the zone by the write element, corrects write start timing to be closer to write start timing for the track of the boundary area, and writes the one servo pattern on the another track in synchronization with the corrected write start timing.

4. The disk device according to claim 2, wherein the controller determines a reference zone from the multiple zones, corrects write start timing so that a write start positional relationship in another zone other than the reference zone of the multiple zones is closer to a circumferential positional relationship for a write start position set for each zone boundary, and writes a servo pattern on a track of the another zone in synchronization with the corrected write start timing.

5. The disk device according to claim 2, wherein the controller, when one servo pattern corresponding to a zone is written on another track other than the track of the boundary area in the zone by the write element, corrects write start timing according to the timing correction data identical to the timing correction data for the track of the boundary area, and writes the one servo pattern on the another track in synchronization with the corrected write start timing.

6. The disk device according to claim 2, wherein the controller, when one servo pattern corresponding to the zone is written on each track of each of the multiple zones by the write element, generates the timing correction data according to the circumferential offsets of the read element and the write element at the radial position, corrects write start timing according to the timing correction data, and writes the one servo pattern on the track in synchronization with the corrected write start timing.

7. The disk device according to claim 1, wherein the controller, when two servo patterns corresponding to two adjacent zones are written, by the head, on a track of a boundary area between the two adjacent zones of the multiple zones, writes one servo pattern of the two servo patterns on the track of the boundary area, writes an erase pattern immediately after the one servo pattern, and writes, over the erase pattern, the other servo pattern of the two servo patterns, at a position circumferentially shifted from the one servo pattern in the track of the boundary area, according to the timing correction data.

8. The disk device according to claim 1, wherein the controller, when two servo patterns corresponding to two adjacent zones are written, by the head, on a track of a boundary area between the two adjacent zones of the multiple zones, writes one servo pattern of the two servo patterns on the track of the boundary area, and writes the other servo pattern of the two servo patterns, at a position circumferentially continued from the one servo pattern in the track of the boundary area, according to the timing correction data.

9. The disk device according to claim 1, wherein the head includes a read element and a write element, and when two servo patterns corresponding to two adjacent zones are written, by the head, on a track of a boundary area between the two adjacent zones of the multiple zones, offset information in which a radial position is associated with circumferential offsets of the read element and the write element, for multiple radial positions is acquired, and timing correction data is generated according to the radial position of the boundary area and the offset information.

10. A manufacturing method for a disk device, comprising:

in a first case in which a disk device includes a head and a disk medium including multiple zones concentrically provided, and two servo patterns corresponding to two adjacent zones are written, by the head, on a track of a boundary area between the two adjacent zones of the multiple zones in the disk medium, generating timing correction data according to a radial position of the boundary area;

writing one servo pattern of the two servo patterns on the track of the boundary area, in the first case; and writing the other servo pattern at a position circumferentially shifted from the one servo pattern on the track of the boundary area, according to the timing correction data, in the first case, wherein the head includes a read element and a write element, and the generating includes generating, in the first case, the timing correction data according to circumferential offsets of the read element and the write element at the radial position of the boundary area.

11. The manufacturing method according to claim 10, wherein the writing the other servo pattern includes:

correcting write start timing according to the timing correction data, in the first case; and writing the other servo pattern on the track of the boundary area in synchronization with the corrected write start timing, in the first case.

12. The manufacturing method according to claim 11, further comprising:

in a second case in which one servo pattern corresponding to a zone is written on another track other than the track of the boundary area in the zone by the write element, correcting write start timing to be closer to write start timing for the track of the boundary area; and writing the one servo pattern on the another track in synchronization with the corrected write start timing in the second case.

13. The manufacturing method according to claim 11, further comprising:

determining a reference zone from the multiple zones, in the first case;

correcting write start timing so that a write start positional relationship in another zone other than the reference zone of the multiple zones is closer to a circumferential positional relationship for a write start position set for each zone boundary, in the first case; and writing a servo pattern on a track of the another zone in synchronization with the corrected write start timing, in the first case.

14. The manufacturing method according to claim 11, further comprising:

in a second case in which one servo pattern corresponding to a zone is written on another track other than the track of the boundary area in the zone by the write element, correcting write start timing according to the timing correction data identical to the timing correction data for the track of the boundary area; and writing the one servo pattern on the another track in synchronization with the corrected write start timing in the second case.

15. The manufacturing method according to claim 11, further comprising:

in a third case in which one servo pattern corresponding to the zone is written on each track of each of the multiple zones by the write element, generating the timing correction data according to the circumferential offsets of the read element and the write element at the radial position;

correcting write start timing according to the timing correction data, in the third case; and writing the one servo pattern on the track in synchronization with the corrected write start timing, in the third case.

16. The manufacturing method according to claim 10, further comprising:

writing an erase pattern immediately after the one servo pattern, after writing the one servo pattern, in the first case, wherein the writing of the other servo pattern includes writing the other servo pattern over the erase pattern, at a position circumferentially shifted from the one servo pattern in the track of the boundary area, according to the timing correction data, in the first case.

17. The manufacturing method according to claim 10, wherein the writing of the other servo pattern includes writing the other servo pattern at a position circumferentially continued from the one servo pattern in the track of the boundary area, according to the timing correction data, in the first case.

18. The manufacturing method according to claim 10, wherein the head includes a read element and a write element, and the generating includes:

acquiring offset information in which a radial position is associated with circumferential offsets of the read element and the write element for multiple radial positions; and generating timing correction data according to the radial position of the boundary area and the offset information.

* * * * *